UNITED STATES PATENT OFFICE.

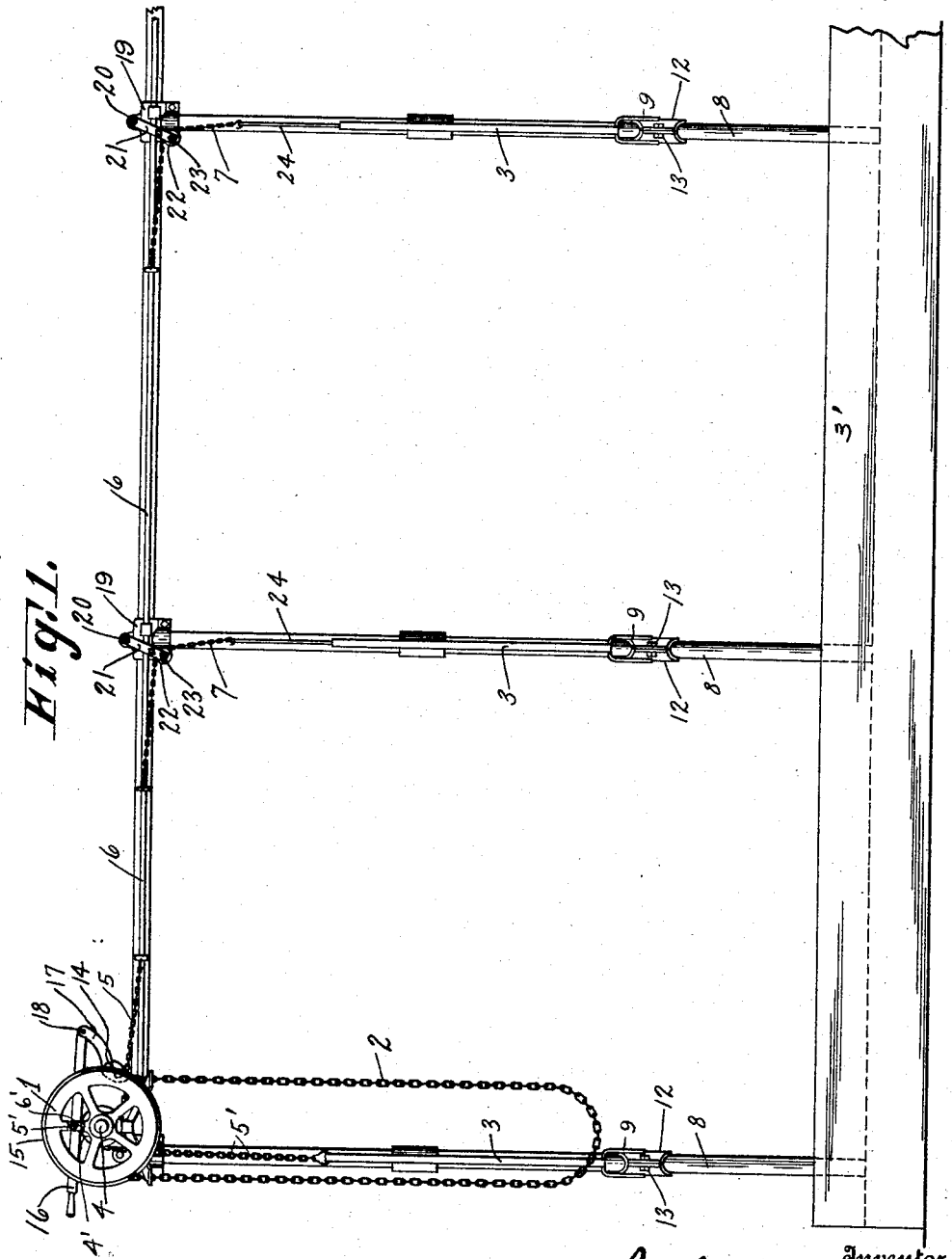

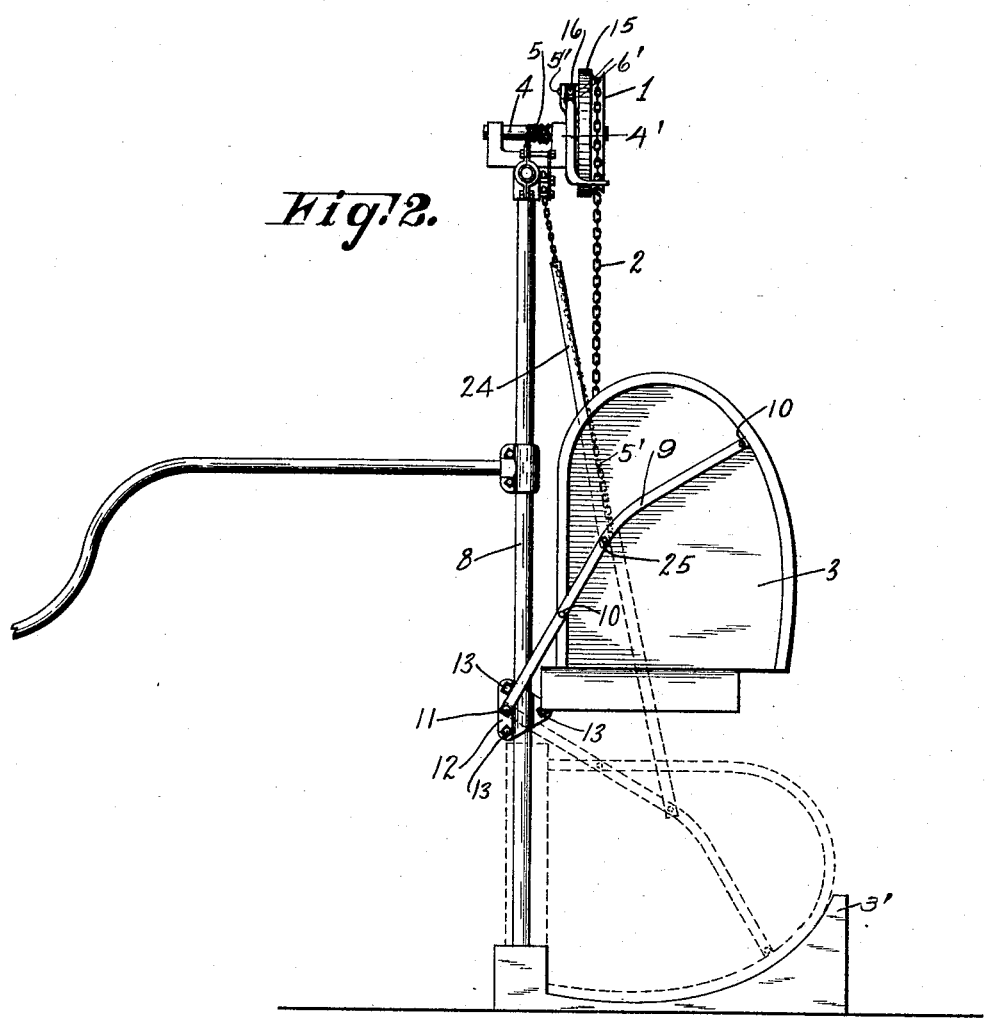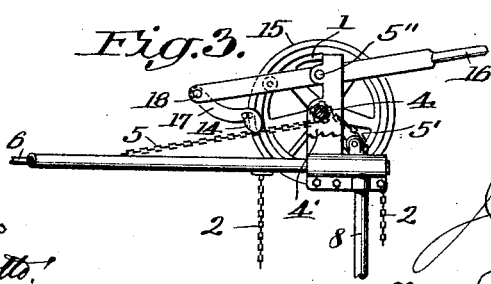

JOHN JAMES, OF FORT ATKINSON, WISCONSIN, ASSIGNOR TO JAMES MANUFACTURING COMPANY, OF FORT ATKINSON, WISCONSIN.

MANGER AND PARTITION OPERATING DEVICE.

1,186,514.      Specification of Letters Patent.      Patented June 6, 1916.

Application filed March 9, 1914. Serial No. 823,310.

*To all whom it may concern:*

Be it known that I, JOHN JAMES, a citizen of the United States, residing at Fort Atkinson, county of Jefferson, and State of Wisconsin, have invented new and useful Improvements in Manger and Partition Operating Devices, of which the following is a specification.

My invention relates to improvements in devices by which a plurality of mangers or partitions may be simultaneously raised, lowered or retained in their raised position, and the same is further explained by reference to the accompanying drawings in which—

Figure 1 represents a front view thereof in connection with a plurality of manger partitions, Fig. 2 is an end view showing one of the partitions in its raised position and Fig. 3 is an enlarged detail view looking toward the front of the stall.

Like parts are identified by the same reference numerals throughout both views.

1 is a sprocket wheel.

2 is a sprocket chain and 3 is a partition by which the manger 3' is subdivided into a plurality of compartments.

When it is desired to raise the partitions, the sprocket wheel 1 and rim 15 are revolved in one direction, and when it is desired to lower the partition the brake bearing is raised from the rim 15 when said partitions will descend of their own gravity, whereby said wheel and rim will be revolved in the opposite direction. Motion is communicated from the hand of the operator to the sprocket wheel 1 through the sprocket chain 2 and from said wheel to the partitions 3 through the crank shaft 4, chains 5 and 5', rods 6 and one or more chains 7, said chain 5' being connected directly with one of said partitions 3. The rod 6 may be extended above a plurality of partitions and separate chains 7, each chain 7 being connected at one end to said rod and at its opposite end to one of said partitions. The several partitions 3 are each pivotally supported from one of the posts 8 by one or more bars 9 and said bars are rigidly connected at one end to said partitions by a plurality of rivets 10, their opposite ends being connected to said posts by a pivotal bolt 11, clamping plates 12 and a plurality of bolts 13. When it is desired to raise said partitions it is necessary simply to draw downward upon one side of said chain 2 when motion will be communicated therefrom to said several partitions through the mechanism described, whereby a large number of partitions may, if desired, be simultaneously raised.

14 is a clutch which is adapted to grip the rim 15. The rim 15 is supported from the shaft 4 and may, if desired, be formed integral with the sprocket wheel 1. When the lever 16 is released from the hand of the operator, the clutch 14 is adapted to grip the respective interior and exterior sides of the rim 15, whereby said rim 15, wheel 1 and shaft 4 are prevented from being revolved by the gravity of the partitions, the friction of said clutch being such as to normally retain all of said partitions in their raised position. When, however, it is desired to lower said partitions from the position shown in Fig. 2 to that indicated by dotted lines in said figure, the clutch is brought out of gripping engagement with said rim 15 by a downward pull upon the free end of the operating lever 16. The lever 16 is pivotally connected at one end with the clutch 14 through the arms 17 and pivotal bolt 18, and said lever is pivotally connected near its center with the journal box 4' by the pivotal bolt 5" and lugs 6'. The several chains 7 are centrally supported between their respective ends from the posts 8 through the clamping plates 19, pivotal bolts 20, links 21, pulleys 22 and pulley supporting bolts 23. While the lower ends of the several chains 7 may be connected directly with the partitions 3, I preferably interpose a metallic bar 24 between such lower ends and said partitions and the lower ends of said bars 24 are connected to said partitions by the pivotal bolts 25.

Having thus described my invention, what I claim as new, and desire to secure by Letters Patent, is—

1. In a device of the described class, the combination of a supporting frame, a horizontally movable shaft slidably supported on the upper side of said frame, a plurality of manger partitions pivotally connected with the standards of said frame, means for connecting said horizontally movable shaft with one or more of said partitions, a sprocket wheel and wheel supporting shaft, a sprocket chain mounted upon said wheel, means for connecting said wheel supporting shaft with said horizontally movable shaft, a friction rim connected with said revoluble shaft, a clutch adapted to grip said rim, an operating lever connected with said clutch and an arm communicating between said clutch and operating lever.

2. A device of the class described, comprising the combination of a supporting frame, a plurality of manger partitions pivotally connected with the standards of said frame, means for operating said partitions simultaneously, said means consisting of a sprocket wheel and wheel supporting shaft, a sprocket chain mounted upon said wheel, means for connecting said wheel supporting shaft with each of said manger partitions, a friction rim connected with said shaft, a clutch adapted to grip said rim, an operating lever connected with said clutch and an arm communicating between said clutch and operating lever.

In testimony whereof I affix my signature in the presence of two witnesses.

JOHN JAMES.

Witnesses:
HARRY C. SEAVERT,
AL WARD.

Copies of this patent may be obtained for five cents each, by addressing the "Commissioner of Patents, Washington, D. C."